US005968629A

United States Patent [19]

Masui et al.

[11] Patent Number: 5,968,629

[45] Date of Patent: Oct. 19, 1999

[54] ACOUSTIC ABSORBING COMPONENT AND PRODUCTION PROCESS THEREOF

[75] Inventors: Syohei Masui, Soraku-gun; Satoru Funakoshi, Osaka, both of Japan

[73] Assignee: Sumitomo Chemical Company, Ltd., Osaka, Japan

[21] Appl. No.: 08/645,500

[22] Filed: May 16, 1996

[30] Foreign Application Priority Data

May 16, 1995 [JP] Japan .................................... 7-116729

[51] Int. Cl.$^{6}$ ............................. B29C 67/20; B32B 3/12; B32B 3/30; E04B 1/82

[52] U.S. Cl. ............................ 428/77; 156/220; 156/245; 181/288; 181/290; 264/453; 264/46.8; 264/271.1; 264/321; 264/325; 428/218; 428/309.9; 428/316.6; 428/317.9; 428/318.6

[58] Field of Search ............................. 428/309.9, 316.6, 428/317.9, 71, 218, 306.6, 318.6, 77; 181/288, 290; 156/220, 245; 204/45.3, 46.8, 257, 271.1, 321, 325

[56] References Cited

U.S. PATENT DOCUMENTS

| | | | |
|---|---|---|---|
| 4,035,215 | 7/1977 | Goldstone . | |
| 4,190,697 | 2/1980 | Ahrens | 428/316.6 |
| 4,670,331 | 6/1987 | Radvan et al. . | |
| 4,791,019 | 12/1988 | Ohta et al. | 428/304.4 |
| 4,863,791 | 9/1989 | Steward et al. | 428/310.5 |
| 4,925,615 | 5/1990 | Willis et al. . | |
| 5,200,252 | 4/1993 | Kelman | 428/159 |
| 5,258,089 | 11/1993 | Tanaka et al. . | |
| 5,501,895 | 3/1996 | Finley et al. | 428/194 |
| 5,558,931 | 9/1996 | Biggs et al. | 428/218 |

FOREIGN PATENT DOCUMENTS

| | | |
|---|---|---|
| 0428786A1 | 5/1991 | European Pat. Off. . |
| 0687548A2 | 12/1995 | European Pat. Off. . |
| 6-332466 | 12/1994 | Japan . |

OTHER PUBLICATIONS

Fujii Kiyonobu, "Preparation of Composite", Patent Abstracts of Japan, 06234129, Aug. 23, 1994.

*Primary Examiner*—Blaine Copenheaver
*Attorney, Agent, or Firm*—Pillsbury Madison & Sutro LLP

[57] ABSTRACT

An acoustic absorbing component comprising a fiber-reinforced thermoplastic resin expanded body having a percentage of void not less than 50 vol %, and a resin molded body. The fiber-reinforced thermoplastic resin expanded body is fused under a pressure to at least a part of a surface of said resin molded body.

21 Claims, 7 Drawing Sheets

ACOUSTIC ABSORBING COMPONENT AND PRODUCTION PROCESS THEREOF

BACKGROUND OF THE INVENTION

1. Field of the Invention

The present invention relates to an acoustic absorbing component and a production process thereof.

2. Related Background Art

Acoustic absorbing materials (sound absorbing materials) have been used heretofore in many fields and are often used typically for walls and ceilings of anechoic room.

A specific example of such acoustic absorbing materials generally used is a combination of plate-shaped acoustic absorbing components in which woven cloth covers a porous material such as glass wool. These components are suitably applicable to applications in a relatively large scale such as the anechoic room, but are not suitable for acoustic absorbing components for automobile such as component s in an automobile engine room including an automobile engine cover. Requirements for acoustic absorbing components for automobile are capability of being used in a limited space and capability of exhibiting a sufficient acoustic absorbing effect. The convent ional acoustic absorbing materials as described above, however, had a lot of problems; for example, it was not easy to freely shape them so as to be compatible with the space, their acoustic absorbing performance was degraded by absorption of oil or water, an increase of the weight due to the absorption of oil or water made retention of the shape difficult, and so on.

Further, the acoustic absorbing components for automobile, such as those for automobile engine and surroundings, are demanded to have not only excellent acoustic absorbing performance, but also light weight. In addition, they need to have durability or to be resistant to peeling or the like in their operating environments. The acoustic absorbing components conventionally known are not enough in these respects, either.

SUMMARY OF THE INVENTION

An object of the present invention is to provide an acoustic absorbing component light in weight and excellent in durability and acoustic absorbing performance, which can be readily produced not only in a relatively large scale, but also in a compact and complex configuration, and a production process thereof.

The acoustic absorbing component of the present invention is an acoustic absorbing component comprising a fiber-reinforced thermoplastic resin expanded body having a percentage of void being not less than 50 vol %, and a resin molded body, wherein the fiber-reinforced thermoplastic resin expanded body is fused under a pressure to at least a part of a surface of the resin molded body. With the acoustic absorbing component of the present invention in this structure, the fiber-reinforced thermoplastic resin expanded body effectively absorbs sound, and the resin molded body maintains the strength of the component and acts as a designed portion or a decorated portion of the component. Since in the acoustic absorbing component of the present invention the fiber-reinforced thermoplastic resin expanded body and the resin molded body are joined with each other through a mixture layer thereof, they will not be peeled off from each other even in use under severe conditions, thus assuring excellent durability. Accordingly, the acoustic absorbing component of the present invention is light in weight and excellent in durability and acoustic absorbing performance, and the acoustic absorbing component of the present invention can be readily produced either in a large scale or in a compact scale because it can be molded by the method of the present invention described below.

In the above acoustic absorbing component of the present invention, the fiber-reinforced thermoplastic resin expanded body is preferably projected out from a part of the surface of the resin molded body. In this case, it is particularly preferred that a height in the longitudinal direction of the expanded body be greater than a width (thickness) in a direction perpendicular to the longitudinal direction. This arrangement of the fiber-reinforced thermoplastic resin expanded body tends to extend the wavelength region of sound effectively absorbed to the low frequency side, thereby further improving the acoustic absorbing performance.

In the acoustic absorbing component of the present invention, the resin molded body may be a second fiber-reinforced thermoplastic resin expanded body having a percentage of void smaller than the percentage of void of the above-mentioned fiber-reinforced thermoplastic resin expanded body (first fiber-reinforced thermoplastic resin expanded body). When the acoustic absorbing component is composed of the two types of fiber-reinforced thermoplastic resin expanded bodies having the mutually different percentages of void, they effectively absorb the sound in the both wavelength regions of the respective expanded bodies effective to absorption.

A first production process of the present invention is a method effective to produce the above acoustic absorbing component of the present invention, which comprises:

a step of locating a fiber-reinforced thermoplastic resin expanded body having a percentage of void being not less than 50 vol % in a recessed portion provided in at least one of cavity faces of a pair of first and second molds kept in an open state;

a step of supplying a molten thermoplastic resin through a resin-supplying gate into a cavity formed between the cavity faces of the first and second molds kept in an open state; and a step of closing the first and second molds until a predetermined cavity clearance results between the first and second molds, so as to shape the thermoplastic resin, thereby obtaining a resin molded body, and fusing the fiber-reinforced thermoplastic resin expanded body to at least a part of a surface of the resin molded body under a pressure.

By the first production process of the present invention, not only a large-scale acoustic absorbing component but also a compact and complex acoustic absorbing component can be readily produced in accordance with a configuration of the cavity faces of molds used. Since in the production step the fiber-reinforced thermoplastic resin expanded body is firmly joined with the resin molded body through the mixture layer thereof, the acoustic absorbing component excellent in durability can be efficiently produced. Further, because in the first production process of the present invention the molten resin is supplied in the open state of the molds and the molten resin flows in the cavity by relatively small mold closing force, a relatively low pressure is exerted on the fiber-reinforced thermoplastic resin expanded body set in the recessed portion and thus, the percentage of void thereof can be readily maintained higher.

A second production process of the present invention is a method effective to produce the above acoustic absorbing component of the present invention, which comprises:

a step of locating a fiber-reinforced thermoplastic resin expanded body having a percentage of void being not less than 50 vol % in a recessed portion provided in at least one of cavity faces of a pair of first and second molds kept in an open state;

a step of closing the first and second molds until a predetermined cavity clearance results between the first and second molds and maintaining in a closed state a cavity formed between the cavity faces of the first and second molds; and a step of injecting a molten thermoplastic resin through a resin-supplying gate into the cavity kept in the closed state so as to shape the thermoplastic resin, thereby obtaining a resin molded body, and fusing the fiber-reinforced thermoplastic resin molded body to at least a part of a surface of the resin molded body under a pressure.

By the above second production process of the present invention, not only a large-scale acoustic absorbing component but also a compact and complex acoustic absorbing component can be readily produced in accordance with a configuration of the cavity faces of molds used. Since in the production step the fiber-reinforced thermoplastic resin expanded body is firmly joined with the resin molded body through the mixture layer thereof, the acoustic absorbing component excellent in durability can be efficiently produced.

A third production process of the present invention is a method effective to produce the above acoustic absorbing component of the present invention, which comprises:

a step of locating a fiber-reinforced thermoplastic resin expanded body having a percentage of void being not less than 50 vol % in a recessed portion provided in at least one of cavity faces of a pair of first and second molds kept in an open state;

a step of locating a thermoplastic resin sheet at least a surface of which is pre-heated at a temperature not less than a resin melting temperature thereof, in a cavity formed between the cavity faces of the first and second molds kept in an open state; and a step of closing the first and second molds until a predetermined cavity clearance results between the first and second molds, so as to shape the thermoplastic resin sheet, thereby obtaining a resin molded body, and fusing the fiber-reinforced thermoplastic resin expanded body to at least a part of a surface of the resin molded body under a pressure.

By the above third production process of the present invention, not only a large-scale acoustic absorbing component but also a compact and complex acoustic absorbing component can be readily produced in accordance with a configuration of the cavity faces of molds used. Since in the production step the fiber-reinforced thermoplastic resin expanded body is firmly joined with the resin molded body through the mixture layer thereof, the acoustic absorbing component excellent in durability can be efficiently produced. Further, the above third production process of the present invention employs the thermoplastic resin sheet having voids, thereby permitting the acoustic absorbing component with the resin molded body having voids therein to be efficiently produced.

The above-mentioned “open state” means a state in which the cavity clearance between the cavity face of the first mold and the cavity face of the second mold is larger than the thickness of a desired product (acoustic absorbing component: molded article). In the processes of the present invention, a preferred arrangement is such that the open state includes a first open state in which the molds are positioned with a cavity clearance therebetween to allow the molded article to be taken out through from between the first and second molds and a second open state in which the cavity clearance is smaller than that in the first open state and such that the expanded body is placed in the first open state and the molten resin is supplied in the second open state.

The present invention is directed to applications of the above acoustic absorbing component of the present invention to the acoustic absorbing components for automobile. Since the acoustic absorbing component of the present invention is light in weight and excellent in durability and acoustic absorbing performance, it can be readily positioned around the automobile engine or the like. When the acoustic absorbing component of the present invention is applied to the automobile acoustic absorbing components, they can effectively shield external noise and achieve a reduction in weight of automobile.

The present invention will become more fully understood from the detailed description given hereinbelow and the accompanying drawings which are given by way of illustration only, and thus are not to be considered as limiting the present invention. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
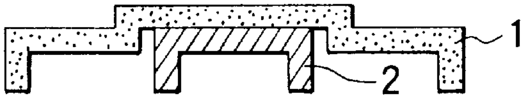
FIG. 1 is a sectional view to show an example of the acoustic absorbing component of the present invention.

The present invention will be explained in more detail with reference to the accompanying drawings. Same or similar portions will be denoted by same reference numerals throughout the drawings.

The acoustic absorbing component of the present invention is first explained.

Figure 2:
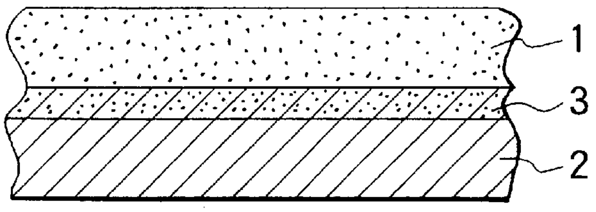
FIG. 2 is a partly enlarged, sectional view of the acoustic absorbing component of the present invention.

FIG. 1 is a sectional view of an embodiment of the acoustic absorbing component of the present invention, showing a structure in which an acoustic absorbing member comprised of a fiber-reinforced thermoplastic resin expanded body (2) having a percentage of void being not less than 50 vol % is fused (or lamination-integrated) under a pressure on at least a part of a surface of a base material comprised of a resin molded body (1). In the acoustic absorbing component of the present invention shown in FIG. 1, the resin molded body (1) and the resin expanded body (2) are firmly joined with each other through a mixture layer (3) thereof, as shown in FIG. 2.

The pressure upon fusing the resin molded body (1) with the resin expanded body (2) is preferably not less than 5 $kgf/cm^2$ (average cavity-internal-face pressure) and particularly preferably between 5 and 20 $kgf/cm^2$. The pressure below the above-mentioned lower limit tends to result in junction with insufficient strength between the two bodies, whereas the pressure above the above-mentioned upper limit tends to result in failing to maintain the percentage of void of the resin expanded body at a desired level.

There is no specific restriction on the thickness or the like of the resin molded body (1) and the resin expanded body (2), but the thickness of the resin expanded body (2) is preferably not less than approximately 2 mm in order to achieve the sufficient acoustic absorbing effect. Considering the strength or the like, the thickness of the resin molded body (1) is preferably approximately between 2 and 5 mm. Further, there is no specific limitation on the thickness of the mixture layer (3), either, but, considering the junction strength, it is preferably approximately between 0.1 and 1 mm.

Here, the resin molded body (1) going to be a base material is formed in a shape suitable for each place of application. A resin used for the resin molded body (1) may be any one of thermoplastic resins normally used for extrusion molding, injection molding, compression molding (press molding), and so on. Specific examples of such resins include ordinary thermoplastic resins such as polyolefins (for example, polyethylene and polypropylene), polystyrene, acrylonitrile-styrene-butadiene copolymer, polyvinyl chloride, polyamide, polycarbonate, polyethylene terephthalate, polybutylene terephthalate, polyphenylene ether and styrene-acrylonitrile copolymer; thermoplastic elastomers; mixtures thereof; and polymer alloys using these thermoplastic resins. The resin is properly selected from such resins, depending upon the strength, weight, and heat resistance required. Generally, the thermoplastic resins are favorably used taking molding cost, moldability, and so on into consideration. Needless to mention, the resins may optionally contain various formulation ingredients normally formulated, such as a stabilizer, a pigment, or a filler.

It is preferable to use a resin having a higher fluidity. In a case where a resin having a higher fluidity is used, the mixture layer tends to be sufficiently formed even if the production condition is a lower pressure and a lower resin temperature and, therefore, the resin expanded body tends to be firmly joined with the resin molded body while the resin expanded body maintains a higher percentage of void.

Further, the resin molded body (1) according to the present invention may contain reinforcing fibers with necessity. Specific examples of such reinforcing fibers include inorganic fibers such as metal fibers (for example, stainless steel fibers), glass fibers and carbon fibers, organic fibers such as aramid fibers, and mixtures thereof. Normally, the fibers preferably have fiber diameters in the range of 3 to 30 μm and fiber lengths in the range of approximately 0.5 to 50 mm. A preferable content of the reinforcing fibers in the resin molded body (1) is normally not more than 50 wt %.

In the cases where the resin molded body (1) is one containing the reinforcing fibers, a raw material thereof may be a fiber-reinforced thermoplastic resin sheet such as one obtained by the laminating process (a laminating-process fiber-reinforced thermoplastic resin sheet) or one obtained by the sheet making process (a sheet-making-process fiber-reinforced thermoplastic resin sheet).

Here, the laminating-process fiber-reinforced thermoplastic resin sheet is a sheet forming stock, for example, obtained by forming a laminate of a thermoplastic resin and a mat of strand reinforcing fibers, in which needles penetrate a plurality of strand reinforcing fiber bundles to get tangled with each other, and then heating and pressing the laminate. On the other hand, the sheet-making-process fiber-reinforced thermoplastic resin sheet is a sheet forming stock, for example, obtained by forming a non-woven material (sheet-making web) by the sheet making process from a fluid dispersion (suspension), in which reinforcing fibers having diameters of 3 to 30 μm and lengths of approximately 3 to 50 mm and thermoplastic resin powder are uniformly mixed in water, and then heating and pressing the non-woven material. For the cases where the configuration of the resin molded body (1) is complex or where the molded body itself has voids, a sheet preferably used is the sheet-making-process fiber-reinforced thermoplastic resin sheet having higher degrees of freedom of moldability and permitting an arbitrary percentage of the voids formed therein. If the resin molded body (1) has voids, the percentage of the voids in the resin molded body (1) is preferably lower than that of the fiber-reinforced thermoplastic resin expanded body (2) described later from the viewpoint of securing enough strength as a base material. When the acoustic absorbing component has the two types of resin molded body (1) and resin expanded body (2) having mutually different percentages of void as in this case, they effectively absorb the sound in the both wavelength regions to be effectively absorbed thereby, and the acoustic absorbing performance is further improved thereby.

Specific examples of the matrix resin for forming such fiber-reinforced thermoplastic resin sheets are the same resins as described above, and specific examples of the reinforcing fibers are also the same fibers as described above.

In order to exhibit the sufficient acoustic absorbing effect in a limited space, the percentage of void of the fiber-reinforced thermoplastic resin expanded body (2) to become an acoustic absorbing member according to the present invention can be changed with necessity so as to be adjusted in accordance with a frequency band to be absorbed. Since the resin expanded body (2) is demanded to have excellent lightweight and acoustic absorbing properties and high strength, the acoustic absorbing member according to the present invention is formed of the fiber-reinforced thermoplastic resin expanded body having the percentage of void being not less than 50 vol %, preferably between 50 and 90 vol % and particularly preferably between 65 and 85 vol %, and provided with these properties. When the percentage of void is not less than 50 vol %, the acoustic absorbing performance by the resin expanded body is improved. When the percentage of void is not less than 70 vol %, this tendency becomes more outstanding.

Such a fiber-reinforced thermoplastic resin expanded body can be readily produced normally from the raw material of the sheet-making-process fiber-reinforced thermoplastic resin sheet stated above, which may have a high percentage of void. The resin expanded body (2) according to the present invention can be formed in a shape suitable for each operating place.

The fiber-reinforced thermoplastic resin sheet as a raw material is as described above, and the reinforcing fibers are properly selected according to acoustic absorbing characteristics required. Preferably used reinforcing fibers are glass fibers, which demonstrate high acoustic absorbing performance and reinforcing effect at low cost. The diameter, length and content of the reinforcing fibers are properly selected according to the predetermined percentage of void and the desired strength of the resin expanded body (2). The diameter, length and content of the reinforcing fibers are usually about 3–30 $\mu$m, about 5–50 mm and about 40–80 wt %, respectively. A preferable fiber length of the reinforcing fibers is 20 or more mm in order to attain sufficient compressive strength. A preferred matrix resin of the resin expanded body (2) is a resin having a high melting temperature to resist the temperature of the resin when integrally joined with the resin molded body (1), and ordinary polypropylene based resins are practically advantageous in respect of the cost or the like.

A method for obtaining the fiber-reinforced thermoplastic resin expanded body using the fiber-reinforced thermoplastic resin sheet is as follows:

(i) a method by heating the fiber-reinforced thermoplastic resin sheet to expand it thickwise by spring back force of the reinforcing fibers so as to achieve a predetermined percentage of void and to shape it into a predetermined configuration at the same time; or (ii) a method by pre-heating the fiber-reinforced thermoplastic resin sheet to expand it thickwise so as to achieve a percentage of void larger than the predetermined percentage of void and thereafter compression-molding it into a predetermined configuration with the predetermined percentage of void (which is a so-called expansion molding process). Generally, the latter method based on the expansion molding process is preferable because of excellent moldability.

Since the configuration of the acoustic absorbing component itself according to the present invention is properly selected according to an application circumstance of the acoustic absorbing component, there is no specific restriction on the configuration at all as long as the acoustic absorbing component has the above essential features of the present invention. Depending upon a use form of the acoustic absorbing component, the resin expanded body (2) may be provided on the entire surface or a partial surface of the resin molded body (1) or may be provided in a two-split form. The configuration of each of the resin molded body (1) and the resin expanded body (2) is designed in shape and size suitable for use as an acoustic absorbing component, thereby achieving the maximum acoustic absorbing effect within the configuration possibly taken in relation with other components.

The foregoing explained a suitable embodiment of the acoustic absorbing component of the present invention, but it should be noted that the acoustic absorbing component of the present invention is by no means limited to the above embodiment.

Figure 3:
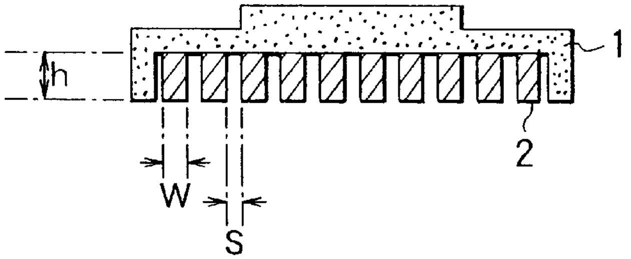
FIG. 3 is a sectional view to show another example of the acoustic absorbing component of the present invention.

For example, as shown in FIG. 3, a plurality of fiber-reinforced thermoplastic resin expanded bodies (2) may be arranged as projecting from the surface of the resin molded body (1). In this case, the height (h) in the longitudinal direction of the resin expanded bodies (2) is preferably greater than the width (w) thereof in the direction perpendicular to the longitudinal direction. With this structure of the resin expanded bodies (2), the wavelength region of sound effectively absorbed is extended to the low frequency side with the increase of the surface area of the resin expanded body (2) which is an acoustic member, thereby further improving the acoustic absorbing performance. Since the resin expanded bodies (2) are firmly joined with the resin molded body (1), as discussed previously, in the acoustic absorbing component of the present invention, this structure causes no drop of the resin expanded bodies (2). In this case, in view of the acoustic absorbing performance, the width (w) of the resin expanded body (2) is preferably approximately 1 to 10 mm, the space (s) between adjacent resin expanded bodies (2) is preferably approximately 0.5 to 2 times greater than the width (w) of the resin expanded body (2), and the height (h) of the resin expanded body (2) is preferably approximately 1 to 10 times greater than the width (w).

An object-side surface of the fiber-reinforced thermoplastic resin expanded body (acoustic absorbing member) according to the present invention may be of an uneven shape having suitable size and roughness, so as to increase the surface area thereof, thereby improving the acoustic absorbing performance.

Figure 4:
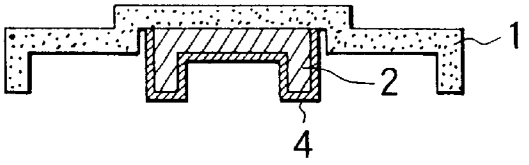
FIG. 4 is a sectional view to show still another example of the acoustic absorbing component of the present invention.

In another example, as shown in FIG. 4, a thermoplastic resin film (4) may be placed (or bonded) onto at least a part of the surface of the fiber-reinforced thermoplastic resin expanded body (2) on the opposite side (or on the object side) to the resin molded body (1). In this case, the film (4) prevents the resin expanded body (2) from absorbing oil or water, thereby preventing degradation of acoustic absorbing performance and further improving the acoustic absorbing performance on the low frequency side. This film (4) may be incorporated with the resin expanded body (2) so as to wrap it.

Taking account of adhesion to the resin expanded body (2), a material for the film (4) used for this purpose is preferably a resin of a structure same as or similar to the matrix resin of the resin expanded body, and a preferably used resin is one neither completely soaking into the expanded fiber-reinforced thermoplastic resin sheet nor being broken upon preheating. Any other resin may be used as long as it has good adhesion. Further, the film may be a laminate film of the resin with another material. A suitable material is selected depending upon the purpose of use.

There is no specific limitation on the thickness of the film (4) if it is a thickness necessary for achieving the above effects. Although it depends upon the type of resin and the place of application, a preferred range of the thickness is approximately from 10 to 100 μm because a too thick film degrades the acoustic absorbing performance (particularly on the high frequency side). The surface of the resin molded body (1) may be provided with a skin material or a printing sheet for decorating purpose, bonded thereto.

For the purpose of heat radiation a through hole such as a round aperture may be optionally formed through the resin molded body (base material) and the fiber-reinforced thermoplastic resin expanded body (acoustic absorbing member).

Now explained is a process for producing the acoustic absorbing component of the present invention.

First explained below is a preferred example of the process for producing the fiber-reinforced thermoplastic resin expanded body (2: acoustic absorbing member) according to the present invention by expansion molding.

Figure 5:
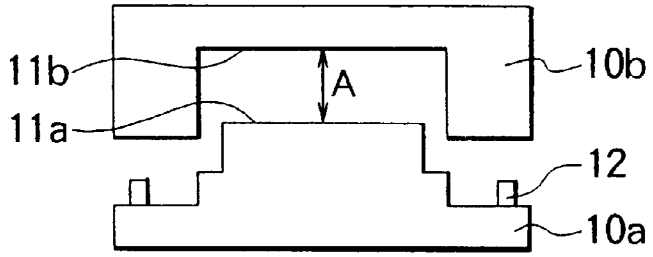
FIG. 5 is a schematic sectional view to show an example of the molds for producing the resin expanded body according to the present invention.

A mold used in this production process is composed of two molds, a fixed mold (10*a*) and a movable mold (10*b*), as illustrated in FIG. 5. The movable mold (10*b*) is movable up and down so as to open and close the mold, and cavity faces (11*a*, 11*b*) of these molds are formed in a stereoscopic configuration matching with a configuration of a desired resin expanded body (2).

Figure 6:
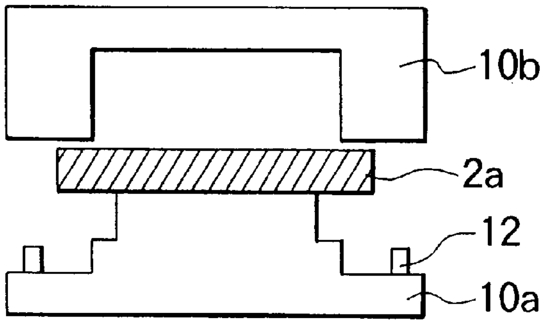
FIG. 6 and FIG. 7 are schematic sectional views each of which shows a state of the molds in one production step in the production process of an example of the resin molded body according to the present invention.
Figure 7:
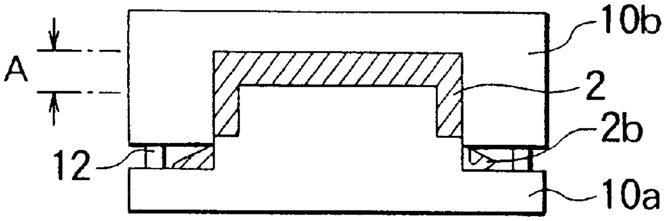

As shown in FIG. 6, an expanded fiber-reinforced thermoplastic resin sheet (2*a*), pre-heated in a far-infrared heating furnace so as to be expanded into a percentage of void not less than 50 vol % and also not less than a desired percentage of void as an acoustic absorbing member (preferably, not less than 80 vol %), is supplied to between the two molds (100*a*, 10*b*) while being kept in the pre-heated state. Then, as shown in FIG. 7, the movable member (10*b*) is moved down to close the molds until the percentage of void of the sheet (2*a*) reaches the desired percentage of void not less than 50 vol %. As a result, the resin expanded body (2) is obtained as shaped in a desired configuration, and marginal edges (2*b*) are cut away at the same time. On this occasion a cavity clearance (A) at the end of closing may be adjusted by controlling the height of stoppers (12) provided in the outer peripheral region of the fixed mold (10*a*: male mold), for example, so as to achieve the desired percentage of void. If the desired resin expanded body (2) should have a complex configuration or a deep-drawn configuration, wrinkling or breakage would occur in the expanded fiber-reinforced thermoplastic resin sheet (2*a*) during the molding process. It is thus effective to hold the sheet by a clamp frame during the supply of the sheet.

If the desired resin expanded body (2) is of a flat shape, no such specific method is necessary, and the expanded fiber-reinforced thermoplastic resin sheet itself, obtained after heated to expand into the desired percentage of void and then cooled, may be used after punched.

In the cases where the thermoplastic resin film (4) is bonded to the resin expanded body (2), the film (4) may be bonded to the resin expanded body (2) by either one of the following methods:

(a) to bond the thermoplastic resin film (4) to the resin expanded body (2) shaped in a predetermined configuration with an adhesive or the like;

(b) to preliminarily mount the thermoplastic resin film (4) on the cavity face (11*a*) in the above production process, mount the fiber-reinforced thermoplastic resin sheet (2*a*) expanded by pre-heating on the film, and thereafter close the mold; or (c) to mount the thermoplastic resin film (4) on the top face of the fiber-reinforced thermoplastic resin sheet (2*a*) expanded by pre-heating and thereafter close the mold.

No specific restriction is imposed on the production process of the acoustic absorbing component of the present invention as long as it is a method for fusing (or lamination-integrating) the resin expanded body (2) under a pressure to at least a part of the base material comprised of the resin molded body (1). A most preferable method, in view of practical use and strength of the acoustic absorbing component obtained, is a simultaneous integration process in which, while the resin molded body (1) is formed on the resin expanded body (2) preliminarily produced, they are heat-sealed under a pressure at the same time.

Typical examples of such a production process are as follows:

(I) a method of lamination integration in which a molten thermoplastic resin is supplied to between the molds on which the resin expanded body (2) in a predetermined shape is mounted, the resin is shaped in a configuration of the resin molded body (1), and at the same time the resin is heat-sealed with the resin expanded body (2) under a pressure; or (II) a method of lamination integration in which the fiber-reinforced thermoplastic resin sheet softened by heating is supplied to between the molds on which the resin expanded body (2) in the predetermined shape is mounted, the sheet is shaped in the configuration of the resin molded body (1) by compression molding, and at the same time the resin is heat-sealed under a pressure with the resin expanded body (2).

These production processes will be described in detail.

The first method of the present invention is a method making use of the compression molding, in which a molten thermoplastic resin (which may contain reinforcing fibers) is supplied to between the male and female molds not closed (or in an open state) and the molds are closed to let the resin flow in the cavity and to fill the resin in the cavity, thereby shaping it.

Figure 8:
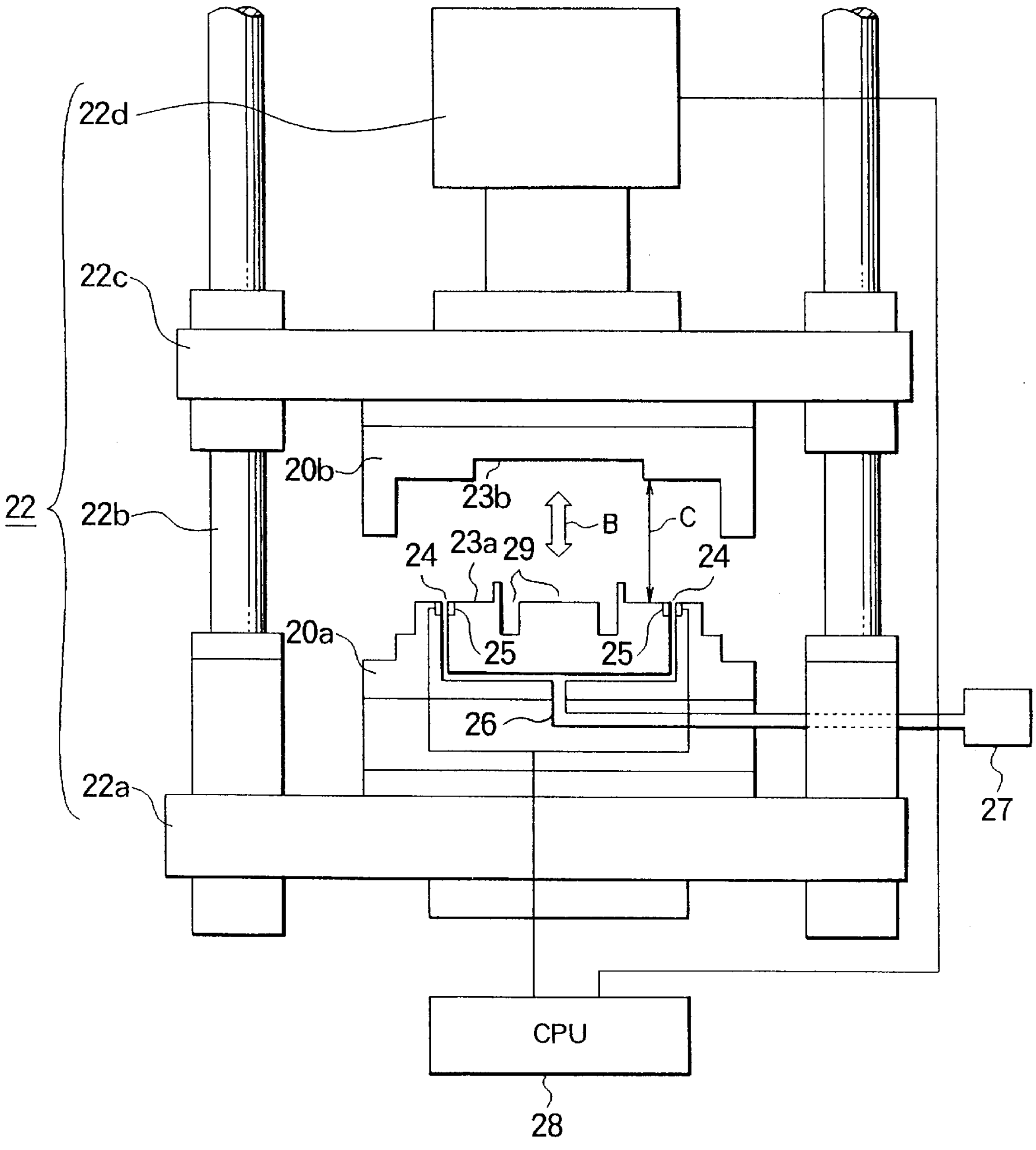
FIG. 8 is a schematic sectional view to show an example of the molds (a mold assembly) for producing the acoustic absorbing component of the present invention by compression molding.

First explained is the mold assembly used in the process of the present invention. The mold assembly according to the present invention is composed of a first mold (20*a*) and a second mold (20*b*), as shown in FIG. 8. The molds are attached to a press unit (22). In FIG. 8, the first mold (20*a*) is fixed to a fixed frame (22*a*) of the press unit (22) (the first mold thus being a fixed mold). The second mold (20*b*) is fixed to a movable frame (22*c*) connected to the fixed frame (22*a*) through connecting rods (22*b*) (the second mold 20*b* thus being a movable mold). A driving unit (22*d*) of the second mold (20*b*) is connected to the movable frame (22*c*), so that the second mold (20*b*) can be moved in directions B (as indicated by the double-headed arrow B). Without any specific restriction, any driving unit may be used for the driving unit (22*d*) of the second mold (20*b*); for example, a hydraulic driving unit may be used.

The first mold (20*a*) and the second mold (20*b*) each have their cavity faces (23*a*) and (23*b*), respectively, facing each other and corresponding to the shape of a desired product. When the first mold (20*a*) and the second mold (20*b*) are closed, the cavity faces (23*a*) and (23*b*) define a cavity substantially coinciding with the outer shape of the desired molded article.

The second mold (20*b*) can be moved by the press unit (22) among (i) a first open position where a cavity clearance (C) between the cavity face (23*a*) of the first mold and the cavity face (23*b*) of the second mold is maintained in a state (first open state) wherein the molded article can be taken out through between the first and second molds, (ii) a second open position where the cavity clearance is maintained in a state (second open state) to be smaller than that in the first open state, and (iii) a closed position where the cavity clearance is maintained in a state (closed state) to substantially match the thickness of the desired molded article. The first and second molds (20*a*, 20*b*) can be maintained at a predetermined closing pressure by the press unit (22). Note that the first and second molds shown in FIG. 8 are in the first open state.

The first mold (20*a*) shown in FIG. 8 is a so-called male mold whose cavity face (23*a*) is formed as a projecting portion. On the other hand, the second mold (20*b*) is a so-called female mold whose cavity face (23*b*) is formed as a recessed portion. However, the second mold may be a male mold while the first mold may be a female mold. In addition, the first mold may be a movable mold while the second mold may be a fixed mold, or the both molds may be movable molds. Furthermore, the first mold may be an upper mold while the second mold may be a lower mold.

The cavity face (23*a*) of the first mold (20*a*) has a resin-supplying gate (24) through which a molten thermoplastic resin is to be supplied. A gate opening/closing means (25) is arranged around the resin-supplying gate (24) to permit opening/closing control of the resin-supplying gate (24). The gate opening/closing means can be a mechanical means (e.g., a shut-off pin) or a means for melting or solidifying the resin near the gate (e.g., a shut-off heater).

A resin extruding unit (27) is connected to the resin-supplying gate (24) through a resin passage (26) formed in the first mold (20*a*). A control unit (CPU) (28) is connected to the gate opening/closing means (25) and the driving unit (22*d*) of the press unit to control these units. In the mold assembly of the present invention, the control unit (28) controls the operations of the driving unit (22*d*) of the press unit and the gate opening/closing means (25), the closing pressure of the first and second molds (20*a*, 20*b*), and so on.

In the first process of the present invention, as described above, the recessed portion (29) capable of receiving the expanded body is formed at a predetermined position in the cavity face of either one of the female and male molds in correspondence to the fiber-reinforced thermoplastic resin expanded body (2) prepared in the predetermined shape, the resin-supplying gate (24) is formed in the cavity face of either of the female and male molds, and the mold used is composed of the pair of female and male molds (20*a*, 20*b*) forming the cavity processed in the configuration of the desired resin molded body (1). One or two or more recessed portions (29) are formed at respective predetermined positions in correspondence to the number and position(s) of the resin expanded body or bodies (2) adhered to be incorporated with the resin molded article (1). The resin-supplying gate (24) is provided with the shut-off mechanism (25) normally arranged to open upon supply of resin and to be closed at the same time as completion of supply of resin. The resin-supplying gate (24) may be a single gate or may comprise a plurality of gates, depending upon the size and shape of the acoustic absorbing component, the setting position(s) of resin expanded body or bodies (2), and so on.

Figure 9:
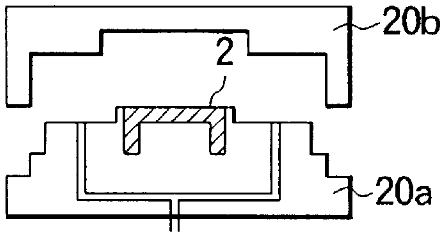
FIGS. 9 to 11 are schematic sectional views each of which shows a state of the molds in one production step for producing the acoustic absorbing component of the present invention by compression molding.

In the first process of the present invention, as shown in FIG. 9, the two female and male molds (20*a*, 20*b*) are first kept in the first open state and the resin expanded body (2) having the percentage of void being not less than 50 vol %, preliminarily formed, is set in the recessed portion (29) of the mold.

In this case, the depth of the recessed portion (29) is preferably determined to be equal to or slightly shallower than the height of the resin expanded body (2) so that the end face of the resin expanded body (2) mounted therein can be kept above the cavity face (23*a*). In order to prevent the molten resin from flowing into between the internal wall of the recessed portion (29) and the outer peripheral surface of the resin expanded body (2), it is necessary to closely fit them with each other. It is also preferred to set the percentage of void of the resin expanded body (2) placed therein higher than a desired percentage of void so that the acoustic absorbing component finally obtained may have the percentage of void not less than 50 vol %.

Figure 10:
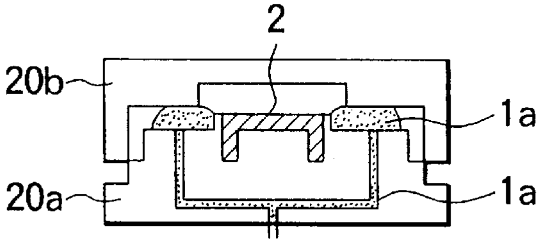

After the resin expanded body (2) is set in the recessed portion (29), the two female and male molds (20*a*, 20*b*) are brought into the second open state, as shown in FIG. 10, and then a predetermined amount of molten resin (1*a*) is supplied through the resin-supplying gate (24) to between the two female and male molds before closed.

This supply of resin can be conducted at any time during the period where the cavity clearance between the molds is greater than the cavity clearance at completion of mold closing (in the closed state). Thus, the resin may be supplied before start of mold closing or during the mold closing operation. Further, the resin may be supplied during suspension of closing midway of the mold closing operation while temporarily stopping the operation at a predetermined position. Namely, the supply of resin may be carried out at any stage during the period where the cavity clearance is wider than that at completion of mold closing, but the resin is preferably supplied during the period where the cavity clearance is the cavity clearance at completion of mold closing plus 1 to 100 mm.

If no resin-supplying gate is formed in the mold, the molten resin can be supplied to between the two female and male molds in the open state after the resin expanded body (2) is set in the recessed portion (29), by an extruder or the like using a resin supplying unit provided outside the mold.

This arrangement cannot employ the above-mentioned supply conditions and is inferior in appearance of the acoustic absorbing component obtained, molding cycles, and controllability of resin, which is thus not always advantageous.

Figure 11:
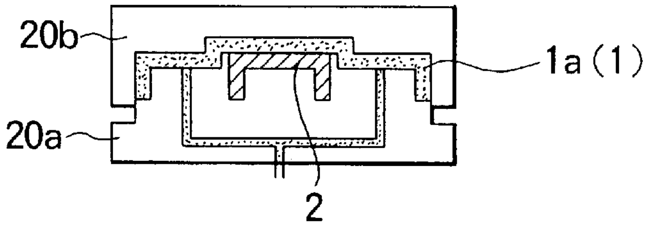

After completion of the supply of molten resin (1*a*), as shown in FIG. 11, the two female and male molds (20*a*, 20*b*) are closed to the predetermined cavity clearance (into the closed state) while the molten resin (1*a*) is flowing and filling in the cavity. In this process the molten resin (1*a*) is shaped into the configuration of the desired resin molded body (1) and the surface portion of the resin expanded body (2) exposed to the cavity is heat-sealed under a pressure with the molten resin (1*a*), thereby being adhered to be integrated therewith. The pressure this time (average cavity-internal-face pressure) is preferably between 5 and 50 kgf/cm$^2$.

The molten resin (1*a*) is cooled and solidified either by cooling the molds as maintaining the mold closing force in this state or by keeping the pressure for a predetermined period of time, thereafter reducing or releasing the mold closing pressure while cooling the molds. In a case where the resin expanded body (2) is heat-sealed under a pressure of not less than 20 kgf/cm$^2$ with the resin molded body (1), the latter method is preferably employed since the resin expanded body tends to be prevented from decreasing percentage of void thereof according to the latter method.

The above process provides the acoustic absorbing component in which the resin expanded body (2) is laminated and integrated by heat-sealing with the resin molded body (1) shaped in the configuration of the mold cavity with an aperture portion of a recessed portion of the resin expanded body (2) being an adhesion surface.

In the cases where the acoustic absorbing component is formed by the compression molding, the molten resin (1*a*)

is supplied when the cavity clearance is wider than the thickness of the resin molded body (1) of the acoustic absorbing component as a final product, and the molten resin (1*a*) flows inside the cavity by the relatively low mold closing force. Therefore, the pressure is low on the resin expanded body (2) set in the recessed portion (29), so that the percentage of void thereof can be readily maintained relatively high.

According to this process, the molten resin (1*a*) applied is a thermoplastic resin having a melting temperature substantially equal to or lower than the melting temperature of the matrix resin forming the resin expanded body (2) and is supplied at as low temperature as possible, whereby it can prevent a drop of the percentage of void of the resin expanded body (2) further more.

Since the cavity clearance can be freely changed in the case of the compression molding process, the process may be modified in such a manner that the expanded fiber-reinforced thermoplastic resin sheet, pre-heated to have a percentage of void being not less than 50 vol %, preferably not less than 80 vol %, is supplied into the recessed portion (29) of the mold kept in the open state while maintaining the pre-heated state, then the molds are once closed to the cavity clearance of almost zero (into the closed state) to form the resin expanded body (2), the molds are opened after the resin expanded body thus formed is cooled, thereafter the molten thermoplastic resin is supplied into the molds in the aforementioned manner, and then the molds are closed and cooled. This modification permits the acoustic absorbing component to be produced by only a pair of molds. In this case, the edges of the resin expanded body (2) project out of the recessed portion (29) and are crushed to become thin and remain in that state in the cavity. The edges cause no problem at all because they are integrated with the molten thermoplastic resin supplied after that so as to become a part of the resin molded body (1).

Next explained is the second process of the present invention.

The second process of the present invention is a process by injection molding, in which the molten thermoplastic resin (which may contain the reinforcing fibers) is supplied to between the two female and male molds kept in the closed state to fill there.

Figure 12:
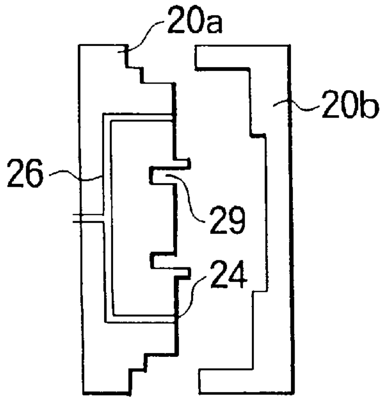
FIG. 12 is a schematic sectional view to show an example of the molds for producing the acoustic absorbing component of the present invention by injection molding.

In this process, as shown in FIG. 12, a recessed portion (29) capable of receiving the fiber-reinforced thermoplastic resin expanded body is provided at a predetermined position of a cavity face of either one of the female and male molds in correspondence to the fiber-reinforced thermoplastic resin expanded body (2: acoustic absorbing member) prepared in a predetermined shape, and a resin-supplying gate (24) is formed in a cavity face of either one of the female and male molds. Further, the process uses a pair of female and male molds (20*a*, 20*b*) processed in a configuration of a desired resin molded body (1: base material) and forming a cavity. One or two or more recessed portions (29) are provided at respective predetermined positions in accordance with the number and position(s) of the resin expanded body or bodies (2) bonded to be integrated with the resin molded body (1). A single resin-supplying gate (24) suffices if it is located so that the molten resin may be charged up to the edges and corners in the molds at as low supply pressure as possible. A plurality of resin-supplying gates (24) may be employed depending upon the size and configuration of the acoustic absorbing component, the setting position of the resin expanded body (2), and so on.

In the second process of the present invention, as shown in FIG. 12, the two female and male molds (20*a*, 20*b*) are first kept in the open state and the resin expanded body (2) having the percentage of void being not less than 50 vol %, preliminarily produced, is set in the recessed portion (29).

In this case, the depth of the recessed portion (29) is preferably set to be equal to or slightly shallower than the height of the resin expanded body (2), so that the end face of the resin expanded body (2) set in the recessed portion may be kept above the cavity face (23*a*). This is for preventing the resin expanded body (2) from being compressed by the pressure of the resin upon charge of the molten resin to cause a decrease of the percentage of void. It is also necessary for the internal wall of the recessed portion (29) and the outer peripheral surface of the resin expanded body (2) to be closely fit with each other so as to prevent the molten resin from flowing into between them.

The percentage of void of the resin expanded body (2) set in the recess is preferably set to be higher than a desired percentage of void so that the percentage of void in the acoustic absorbing component finally obtained may be not less than 50 vol % even with a slight reduction of the percentage of void due to the resin pressure upon injection charge of the molten resin.

Figure 14:
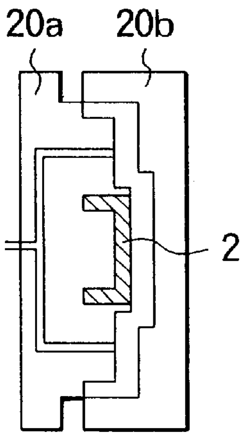
Figure 15:
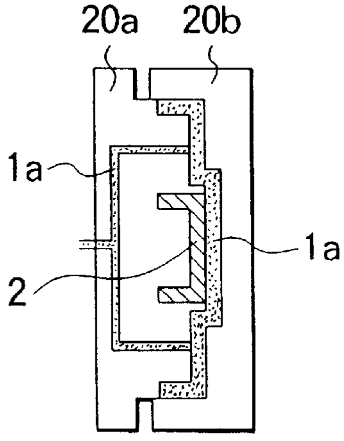

After the resin expanded body (2) is set in the recessed portion (29), the two molds (20*a*, 20*b*) are closed to a predetermined cavity clearance, as shown in FIG. 14, so as to keep the cavity in the closed state, and thereafter a predetermined amount of molten resin (1*a*) is supplied through the resin-supplying gate (24) to fill in the cavity (FIG. 15). The pressure this time (average cavity-internal-face pressure) is preferably between 5 and 50 kgf/cm$^2$.

In this process, the molten resin (1*a*) is a thermoplastic resin having a melting temperature substantially equal to or lower than the melting temperature of the matrix resin forming the resin expanded body (2) and is supplied at as low temperature as possible, whereby the process can prevent a drop of the percentage of void of the resin expanded body (2).

This process is desired to employ some means for preventing the resin expanded body (2) from being crushed by the pressure of the resin supplied to cause a reduction of the percentage of void, for example, a means for lowering the supply pressure of the resin as much as possible, or a means for optimizing thickness distribution between the portion integrated with the resin expanded body (2) of the resin molded body (1) and the other portions.

In the charging step of the molten resin (1) the surface portion of the resin expanded body (2) exposed to the cavity is heat-sealed under a pressure with the molten resin (1*a*). After the molten resin (1*a*) is charged in the cavity, the supply of the resin is stopped. As maintaining the pressure, the molds are cooled to cool and solidify the molten resin (1*a*), thereby obtaining the acoustic absorbing component in which the resin expanded body (2) is laminated and integrated by heat-sealing with the resin molded body (1) shaped in the configuration of the cavity of mold with the aperture portion of the recessed portion of the resin expanded body (2) being an adhesion surface.

Next described is a process using a fiber-reinforced thermoplastic resin sheet as a raw material of the resin molded body (1).

This method is generally classified, depending upon a type of a fiber-reinforced thermoplastic resin sheet used, into a method by flow molding using a fiber-reinforced thermoplastic resin sheet having a percentage of void being not more than 20 vol % when pre-heated above the melting temperature of the matrix resin and a method by expansion molding using a sheet-making-process fiber-reinforced thermoplastic resin sheet having a percentage of void being not less than 50 vol % when pre-heated to expand above the melting temperature of the matrix resin.

Either one of the methods may be employed as the production process of the acoustic absorbing component of the present invention, but the flow molding process is generally more suitable for the cases where the resin molded body has projections such as ribs and bosses and the cases where the resin molded body is demanded to have high strength such as impact resistance, whereas the expansion molding process is more suitable for the cases where the light weight property or the like is required.

The fiber-reinforced thermoplastic resin sheet used in the flow molding process is a fiber-reinforced thermoplastic resin sheet having a percentage of void being not more than 20 vol % when pre-heated above the melting temperature of the thermoplastic resin as a matrix (which will be sometimes called generally as a flow material), such as the laminating-process fiber-reinforced thermoplastic resin sheet, as described previously, and the sheet-making-process fiber-reinforced thermoplastic resin sheet having the percentage of void being not more than 20 vol % when pre-heated and obtained by adjusting the type, fiber length, and content of the reinforcing fibers. A preferable sheet is one produced by the sheet-making process because it permits the reinforcing fibers to be charged into the projections such as ribs and bosses.

The third process of the present invention is a method for producing the acoustic absorbing component by flow molding using the flow material as a raw material of the resin molded body (1).

Figure 16:
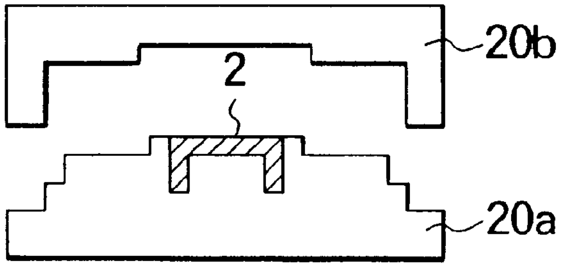
FIGS. 16 to 18 are schematic sectional views each of which shows a state of the molds in one production step for producing the acoustic absorbing component of the present invention by flow molding.

In the third process of the present invention, a pair of female and male molds (20*a*, 20*b*) are the same as those used in the previous compression molding process (the first process) and, as shown in FIG. 16, the fiber-reinforced thermoplastic resin expanded body (2) having the percentage of void being not less than 50 vol % is first set in the recessed portion (29) of the mold. Also in this case, it is preferable that the resin expanded body (2) and the cavity face be closely fit with each other and that the depth of the recessed portion (29) be equal to or slightly shallower than the height of the resin expanded body (2), whereby the end face of the resin expanded body (2) can be set above the cavity face (23*a*).

Figure 17:
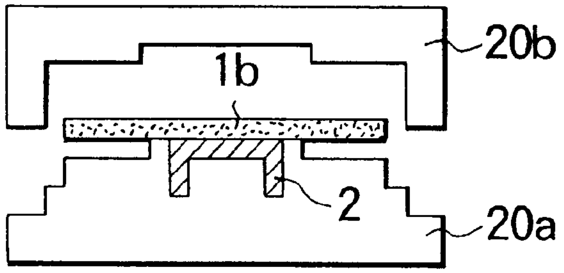

Next, as shown in FIG. 17, the flow material (1*b*) with the percentage of void being not more than 20 vol %, pre-heated above the melting temperature of the thermoplastic resin as a matrix resin in a far-infrared heating furnace, is mounted on the cavity face (23*a*) so as to cover the recessed portion (29) as being maintained in the pre-heated state.

At this time, only the surface portion of the flow material (1*b*) may be pre-heated above the melting temperature of the matrix resin, depending upon the thickness thereof, so as to keep the percentage of void of the entire flow material below 20%.

The flow material (1*b*) mounted does not always have to cover the entire surface of the cavity face (23*a*), but it is desirably mounted so as to cover a region of the projection area of mold as wide as possible, normally to cover 90 or more % thereof, thereby enabling molding with as low mold closing pressure as possible.

Figure 18:
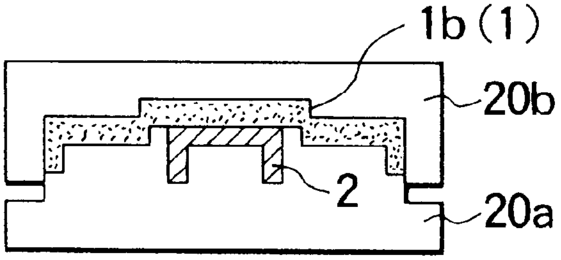

After the flow material (1*b*) is mounted on the cavity face (23*a*), the molds are immediately closed (in the closed state) as shown in FIG. 18 to squeeze the flow material (1*b*) into the molds and to fill it in the molds. Then the molds are cooled in this state to shape the flow material (1*b*) into a configuration of a desired resin molded body (1) and, at the same time, to heat-seal the surface portion of the resin expanded body (2) exposed to the cavity under a pressure with the molten thermoplastic resin of the flow material (1*b*), thereby laminating and integrating them. The pressure this time (average cavity-internal-face pressure) is preferably between 5 and 50 kgf/cm$^2$.

Here, the flow material (1*b*) going to become the resin molded body (1) is usually compressed to the percentage of void of zero or almost zero, but, if necessary, it may retain a little percentage of void. Further, the thickness of the resin molded body (1) in the acoustic absorbing component can be controlled by changing a surface density (weight per unit area) of the stock flow material (1*b*).

When the thickness of the resin molded body (1) is very thick, for example 5 or more mm, two or more flow materials with low surface densities are used in stack. This is because it becomes difficult to uniformly preheat the flow material up to the inside if the surface density of flow material is high. The surface density of flow material is usually in the range of 1500 to 5000 g/m$^2$, though it depends upon the content of the reinforcing fibers.

In this way the above process forms the acoustic absorbing component in which the resin expanded body (2) having the percentage of void being not less than 50 vol % is laminated and integrated by heat-sealing with the fiber-reinforced thermoplastic resin molded body (1).

The fourth process of the present invention is a method by expansion molding using a sheet-making-process fiber-reinforced thermoplastic resin sheet having a percentage of void being not less than 50 vol % when pre-heated to expand above the melting temperature of the matrix resin as a resin molded body (1). This process can produce an acoustic absorbing component in which both the resin expanded body (2) and the resin molded body (1) have voids.

Figure 19:
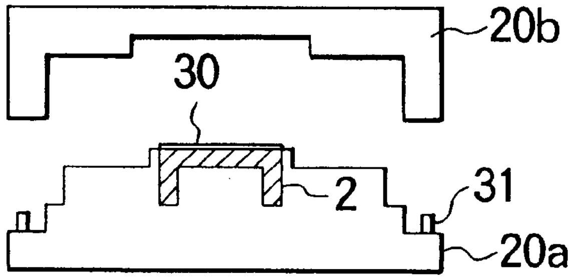
FIGS. 19 to 21 are schematic sectional views each of which shows a state of the molds in one production step for producing the acoustic absorbing component of the present invention by expansion molding.

The fourth process of the present invention employs a pair of female and male molds (20*a*, 20*b*) which are the same as those used in the previous flow molding process (the third process), and, as shown in FIG. 19, the fiber-reinforced thermoplastic resin expanded body (2) having the percentage of void being not less than 50 vol % is first set in the recessed portion (29) of the mold. It is also preferred in this case that the resin expanded body (2) and the cavity face be set so as to be closely fit with each other and that the depth of the recessed portion (29) be equal to or slightly shallower than the height of the resin expanded body (2), whereby the end face of the resin expanded body (2) set in the recess can be set a little above the cavity face (23*a*).

Particularly, this expansion molding process is arranged to close the molds at relatively low mold closing pressure without letting the sheet-making-process fiber-reinforced thermoplastic resin sheet (1*c*) with the percentage of void being not less than 50 vol %, next supplied, flow in the molds. Thus, the pressure is low on the end face of the resin expanded body (2) set in the recessed portion (29), so that a decrease of the percentage of void of the resin expanded body (2) is little. Adhesion pressure, however, also decreases on the adhering surfaces between the resin sheet (1*c*) and the end face of the resin expanded body (2) so as to decrease adhesion between them. It is thus preferred that the end face (2*c*), exposed to the cavity, of the resin expanded body (2) set in the recessed portion (29) be a little higher, normally approximately 0.5 to 5 mm higher, than the cavity face (23*a*), so that the mold closing pressure in this portion becomes slightly higher than that in the other portions. In this case, the percentage of void becomes lower in the portion of the resin molded body (1) in contact with the resin expanded body (2) corresponding to the portion of this height than those in the other portions, which will cause no particular problem in practical use.

Figure 20:
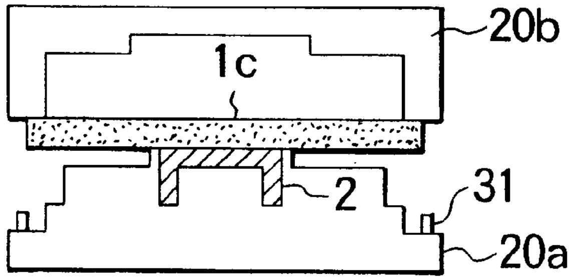

Next, as shown in FIG. 20, the sheet-making-process fiber-reinforced thermoplastic resin sheet (1*c*), expanded to have the percentage of void being not less than 50 vol %, preferably not less than 80 vol %, by pre-heating above the melting temperature of the thermoplastic resin as a matrix resin in the far-infrared heating furnace or the like, is mounted on the cavity face (23*a*) so as to cover the recessed portion (29) as being maintained in the pre-heated state.

The sheet-making-process fiber-reinforced thermoplastic resin sheet (1*c*) used herein may be one consisting of the matrix resin and reinforcing fibers, similar to those of the resin expanded body (2). The type, fiber filling rate, fiber form, and so on of the matrix resin or the reinforcing fibers are properly selected so as to satisfy desired strength and light weight properties. A preferred sheet in respect of the cost is a sheet-making-process fiber-reinforced thermoplastic resin sheet in which the matrix resin is a polypropylene based resin and the reinforcing fibers are glass fibers.

In order to improve adhesion between the resin expanded body (2) and the sheet-making-process fiber-reinforced thermoplastic resin sheet (1c) on this occasion, it is effective to interpose a hot melt type film (30) on the upper end face (the adhesion surface with the resin sheet (1*c*)) of the resin expanded body (2) set in the recessed portion (29).

Figure 21:
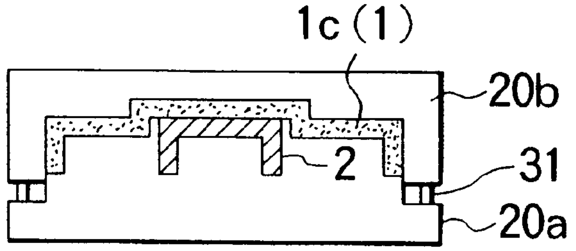

After the sheet-making-process fiber-reinforced thermoplastic resin sheet (1*c*) expanded by pre-heating is mounted on the cavity face (23*a*), the molds are closed as shown in FIG. 21. The pressure this time (average pressure applied to the adhesion surface) is preferably between 5 and 50 kgf/$cm^2$.

For obtaining the resin molded body (1) having the desired percentage of void, though it depends upon the percentage of void of the pre-heated expansion sheet (1*c*) before start of mold closing, it is important to close the molds this time until the cavity clearance at completion of mold closing becomes approximately 20 to 80% of the thickness of the pre-heated expansion sheet (1*c*) before start of mold closing. For example, for obtaining the resin molded body (1) having the percentage of void being 40 vol %, supposing the raw material used is the sheet-making-process fiber-reinforced thermoplastic resin sheet (1*c*) having the percentage of void being 80 vol % after pre-heated to expand, the mold closing is continued before the cavity clearance reaches a half of the thickness before start of mold closing (50% of the original thickness).

If the mold closing were so strong as to decrease the thickness below 20% of the thickness before start of mold closing or if the mold closing were so weak as not to decrease the thickness to 80%, the percentage of void of the resin molded body (1) obtained would be too low (the percentage of void would be below 30 vol %) or the percentage of void would be too high (the percentage of void would be above 85 vol %), which would cause a problem of being inferior in strength.

For closing the molds, it is effective to provide the mold with a stopper or stoppers (31) for determining a mold closing position in order to accurately and easily set the cavity clearance at completion of mold closing in the above range.

Then the sheet-making-process fiber-reinforced thermoplastic resin sheet (1*c*) pre-heated to expand is shaped in a predetermined configuration as a resin molded body (1) so as to have a predetermined percentage of void and is laminated and integrated by heat-sealing with the fiber-reinforced thermoplastic resin expanded body (2) having the percentage of void being not less than 50 vol %, thereby achieving the acoustic absorbing component in which the both resin molded body (1) and resin expanded body (2) have voids.

In the fourth process stated above, a thermoplastic resin film or sheet (4) may be laminated on one surface or on the both surfaces of the sheet-making-process fiber-reinforced thermoplastic resin sheet (1*c*) as a raw material of the resin molded body (1). In this case, the thermoplastic resin sheet is pre-heated together with the film or sheet (4) laminated, and they are supplied to between the molds.

If desired, lamination may be effected in such a manner that the film or sheet (4) is mounted on the cavity face in which the resin expanded body (2) is set, and the sheet-making-process fiber-reinforced thermoplastic resin sheet (1*c*) pre-heated to expand is laid thereon to produce the acoustic absorbing component as laminating the thermoplastic resin film or sheet (4) with the resin molded body (1) on the side of the resin expanded body (2). In this case, the resin expanded body (2) is laminated and integrated by heat-sealing with the resin molded body (1) with intervention of the thermoplastic resin film or sheet (4). In another method, the thermoplastic resin film or sheet (4) is laid on the top surface of the sheet-making-process fiber-reinforced thermoplastic resin sheet (1*c*) pre-heated to expand and the molds are closed to obtain an acoustic absorbing component in which the thermoplastic resin film or sheet (4) is laminated on the opposite surface of the resin molded body (1) to the surface where the resin expanded body (2) is provided. In another example, these methods may be combined to obtain an acoustic absorbing component in which the thermoplastic resin film or sheet (4) is laminated on the both surfaces of the resin molded body (1).

Since in these acoustic absorbing components the thermoplastic resin film or sheet (4) is laminated on the surface of the resin molded body (1), the reinforcing fibers in the resin molded body (1) can be prevented from appearing out of the surface thereof. Thus, they show good appearance and this arrangement can also prevent the resin molded body (1) itself from absorbing oil or water.

In this case, if the resin expanded body (2) is the one as described previously where the thermoplastic resin film or sheet (4) is laminated on the surface thereof, the entire surfaces of the acoustic absorbing component as a product are covered with the laminate of the thermoplastic resin film or sheet (4), and its effect is more remarkable.

As explained above, the acoustic absorbing component of the present invention has the acoustic absorbing member mainly of the fiber-reinforced thermoplastic resin expanded body with a high percentage of void and the base material mainly of the thermoplastic resin molded body which may contain the reinforcing fibers. Since in the present invention the two members are fused under a pressure to be laminated and integrated, the acoustic absorbing component obtained is excellent in the sound-absorbing properties, light weight property, and durability. Further, the production processes according to the present invention can readily produce the acoustic absorbing component even in a compact scale or in a complex configuration. Therefore, the acoustic absorbing component according to the present invention can be applied to applications in wide fields.

The present invention will be explained in further detail with specific examples, but it should be noted that the present invention is by no means intended to be limited to the examples.

REFERENCE EXAMPLE 1

Using the molds shown in FIG. 5 and following the steps shown in FIG. 6 and FIG. 7, the sheet-making-process fiber-reinforced thermoplastic resin expanded body (2) having the percentage of void being 65 vol % was prepared in the configuration shown in FIG. 1 by the following process, and was used in each example to follow.

The sheet-making-process fiber-reinforced thermoplastic resin sheet (available from K-PLASHEET CORPORATION, having the glass fiber content of 45 wt %, the surface density of 1200 g/m$^2$, and the percentage of void of 0%), in which the matrix resin was polypropylene and the reinforcing fibers were glass fibers, was pre-heated to expand at 210° C. in the far-infrared heating furnace so as to have the percentage of void being 80 vol %. Then the expanded fiber-reinforced thermoplastic resin sheet (2*a*) with the percentage of void of 80 vol % was mounted on the cavity face of the male mold (10*a*) as being maintained in the pre-heated state (FIG. 6).

Immediately after that, the molds were closed to shape the sheet (2*a*) in the configuration of cavity (FIG. 7). The cavity clearance at completion of mold closing was set to 3 mm by the stoppers (12) provided in the outer peripheral portion of the male mold (10*a*).

The molds were cooled as maintaining this state. Then the molds were opened and the resin expanded body (2) was taken out.

The resin expanded body (2) obtained had the percentage of void of 65 vol % and the thickness was about 2.7 mm.

EXAMPLE 1

The pair of female and male molds (20*a*, 20*b*) shown in FIG. 8 were set in the first open state, and the sheet-making-process fiber-reinforced thermoplastic resin expanded body (2) with the percentage of void being 65 vol %, obtained in the process of Reference Example 1, was set in the recessed portion (29) formed in the male mold (20*a*) so as to be closely fit in the recessed portion while the top end face thereof was kept nearly at the same height as the cavity face (FIG. 9).

After start of mold closing, the closing was temporarily stopped when the cavity clearance came to be 33 mm (in the second open state), and a molten polypropylene resin (available from SUMITOMO CHEMICAL Co., Ltd., AZ 564) (1*a*) at the resin temperature of 200° C. was supplied into the molds through the resin-supplying gate (24) (FIG. 10).

The mold closing was again started at the same time as completion of supply of a predetermined amount of the resin, and the molten resin (1*a*) was let to flow in the cavity to fill it. Then the mold closing pressure of 10 kgf/cm$^2$ was exerted, and the mold closing was completed when the cavity clearance became 2.8 mm (in the closed state) (FIG. 11). The average cavity-internal-face pressure this time was 10 kgf/cm$^2$.

The molds were cooled in this state and then the molds were opened. Then the acoustic absorbing component in the appearance shown in FIG. 1 was taken out.

The acoustic absorbing component obtained had the resin molded body (1) made of the polypropylene resin in the thickness of 2.5 mm and the resin expanded body (2) with the percentage of void being 65 vol %, and demonstrated excellent sound absorbing performance while being excellent in durability.

EXAMPLE 2

Figure 13:
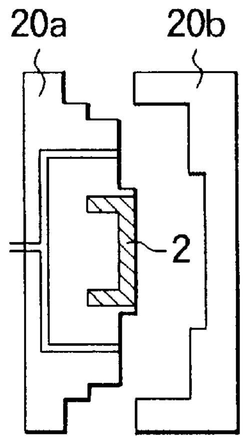
FIGS. 13 to 15 are schematic sectional views each of which shows a state of the molds in one production step for producing the acoustic absorbing component of the present invention by injection molding.

The pair of female and male molds (20*a*, 20*b*) shown in FIG. 12 were set in the open state, and the sheetmaking-process fiber-reinforced thermoplastic resin expanded body (2) with the percentage of void being 65 vol %, obtained by the method of Reference Example 1, was set in the recessed portion (29) formed in the male die (20*ea*) to be closely fit therein so as to keep the upper end face thereof nearly at the same height as the cavity face (FIG. 13). After that, the molds were closed with the mold closing pressure of 20 kgf/cm$^2$, and were kept in the closed state (FIG. 14).

Next, the molten polypropylene resin (available from SUMITOMO CHEMICAL Co. Ltd., AZ 564) (1*a*) at the resin temperature of 200° C. was injected through the resin-supplying gate (24) opening to the cavity face (at the resin pressure of 300 kgf/cm$^2$) to fill the molten resin (1*a*) in the molds (FIG. 15). The average cavity-internal-face pressure this time was 20 kgf/cm$^2$.

Then the molds were cooled in this state, and thereafter the molds were opened. Then the acoustic absorbing component in the appearance shown in FIG. 1 was taken out.

The acoustic absorbing component obtained had the resin molded body (1) made of the polypropylene resin in the thickness of 2.5 mm and the resin expanded body (2) with the percentage of void being 55 vol %, and demonstrated excellent sound absorbing performance while being excellent in durability.

EXAMPLE 3

The pair of female and male molds (20*a*, 20*b*) were set in the open state, and the sheet-making-process fiber-reinforced thermoplastic resin expanded body (2) with the percentage of void being 65 vol %, obtained in the process of Reference Example 1, was set in the recessed portion (29) formed in the male mold (20*a*) to be closely fit in the recessed portion while the top end face thereof was kept nearly at the same height as the cavity face (FIG. 16).

After that, the sheet-making-process fiber-reinforced thermoplastic resin sheet (available from K-PLASHEET CORPORATION, having the glass fiber content of 40 wt %, the surface density of 3600 g/m$^2$, and the percentage of void of 0%), in which the matrix resin was polypropylene and the reinforcing fibers were glass fibers, was pre-heated at the surface temperature of 200° C. in the far-infrared heating furnace, thereby obtaining the flow material (with the percentage of void of 5%) (1*b*). The flow material (1*b*) thus obtained was mounted on the cavity face (23*a*) so as to cover 90% of the projection area of mold (FIG. 17).

Immediately after that, the molds were closed to fill the flow material (1*b*) in the molds and the mold closing pressure of 10 kgf/cm$^2$ was exerted. The mold closing was completed when the cavity clearance became 3.1 mm (FIG. 18). The average cavity-internal-face pressure this time was 10 kgf/cm$^2$.

Then the molds were cooled in this state, and thereafter the molds were opened. Then the acoustic absorbing component in the appearance shown in FIG. 1 was taken out.

The acoustic absorbing component obtained had the resin molded body (1) made of the glass fiber reinforced polypropylene resin in the thickness of 3 mm and the resin expanded body (2) with the percentage of void being 65 vol %, and demonstrated excellent sound absorbing performance while being excellent in durability.

EXAMPLE 4

The pair of female and male molds (20*a*, 20*b*) were kept in the open state, and the sheet-making-process fiber-reinforced thermoplastic resin expanded body (2) having the percentage of void being 65 vol %, obtained by the process of Reference Example 1, was set in the recessed portion (29) formed in the male mold **(20*a*) to be closely fit therein so as to keep the upper end face 2 mm higher than the cavity face. After that, an EVA based hot melt film (30) was mounted on the top end face (adhesion surface) of the resin expanded body (2) (FIG. 19**).

After that, the sheet-making-process glass fiber reinforced thermoplastic resin sheet (available from K-PLASHEET CORPORATION, having the matrix resin of polypropylene, the glass fiber content of 45 wt %, the surface density of 1500 g/m$^2$, and the percentage of void of 0%) on one surface of which a nylon film having the thickness of 25 $\mu$m was laminated was pre-heated at 200° C. in the far-infrared heating furnace to obtain the expanded sheet-making-process fiber-reinforced thermoplastic resin sheet (with the percentage of void of 80%) **(1*c*). Then the expanded resin sheet thus obtained was mounted on the cavity face so as to cover the cavity face (FIG. 20**).

Immediately after that, the molds were closed to compress the expanded sheet-making-process fiber-reinforced thermoplastic resin sheet **(1*c*) to 70% of the thickness, whereby the sheet (1*c*) was shaped in the cavity configuration and was fused to be integrated with the resin expanded body through the hot melt film (30) (FIG. 21**). The average cavity-internal-face pressure this time was 10 kgf/cm$^2$.

Then the molds were cooled in this state, and thereafter the molds were opened. Then the acoustic absorbing component in the appearance shown in FIG. 1 was taken out.

The acoustic absorbing component thus obtained had the resin molded body (1) comprised of the glass fiber reinforced polypropylene resin having the percentage of void of 56 vol % and the thickness of 3.5 mm and the resin expanded body (2) with the percentage of void being 65 vol %. The acoustic absorbing component showed excellent acoustic absorbing performance and was excellent in durability.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 116729/1995 filed on May 16, 1995 is hereby incorporated by reference.

What is claimed is:

1. An acoustic absorbing component comprising a fiber-reinforced thermoplastic resin expanded body having a percentage of voids not less than 50 volume %, and a resin molded body, said fiber-reinforced thermoplastic resin expanded body being fused under pressure to at least a part of a surface of said resin molded body, said fiber-reinforced thermoplastic resin expanded body projecting out of a part of the surface of said resin molded body, expanded body having a height in a longitudinal direction perpendicular to said surface of the resin molded body which is greater than a width of said expanded body in a direction perpendicular to said longitudinal direction.

2. The acoustic absorbing component according to claim 1, wherein said resin molded body is a thermoplastic resin molded body and said fiber-reinforced thermoplastic resin expanded body is an expanded body formed by expansion-molding of a fiber-reinforced thermoplastic resin sheet obtained by a sheet-making process.

3. The acoustic absorbing component according to claim 1, wherein said resin molded body is a fiber-reinforced resin molded body.

4. The acoustic absorbing component according to claim 1, wherein said fiber reinforced thermoplastic resin expanded body is a first fiber-reinforced thermoplastic resin expanded body and said resin molded body is a second fiber-reinforced thermoplastic resin expanded body having a percentage of voids lower than the percentage of voids of said first fiber-reinforced thermoplastic resin expanded body.

5. The acoustic absorbing component according to claim 1, further comprising a mixture layer of said fiber-reinforced thermoplastic resin expanded body and said resin molded body between the expanded body and the molded body.

6. The acoustic absorbing component according to claim 5, wherein a through hole is formed through the resin molded body and the fiber-reinforced thermoplastic resin expanded body.

7. The acoustic absorbing component according to claim 1, wherein said component is an automobile acoustic absorbing component.

8. A process for producing the acoustic absorbing component as set forth in claim 1, comprising:

a step of setting a fiber-reinforced thermoplastic resin expanded body having a percentage of void not less than 50 vol % in a recessed portion formed in at least one of cavity faces of a pair of first and second molds kept in an open state;

a step of supplying a molten thermoplastic resin through a resin-supplying gate into a cavity formed between the cavity faces of said first and second molds kept in an open state; and a step of closing said first and second molds until a predetermined cavity clearance results between the first and second molds, so as to shape said thermoplastic resin, thereby obtaining a resin molded body, and fusing said fiber-reinforced thermoplastic resin expanded body to at least a part of a surface of said resin molded body under a pressure.

9. The process according to claim 8, wherein said thermoplastic resin is a thermoplastic resin containing reinforcing fibers.

10. A process for producing the acoustic absorbing component as set forth in claim 1, comprising:

a step of setting a fiber-reinforced thermoplastic resin expanded body having a percentage of void not less than 50 vol % in a recessed portion formed in at least one of cavity faces of a pair of first and second molds kept in an open state;

a step of closing said first and second molds until a predetermined cavity clearance results between the molds, to make a cavity formed between the cavity faces of said first and second molds in a closed state; and a step of injecting a molten thermoplastic resin through a resin-supplying gate into said cavity kept in the closed state so as to shape the thermoplastic resin, thereby obtaining a resin molded body, and fusing said fiber-reinforced thermoplastic resin expanded body to at least a part of a surface of the resin molded body under a pressure.

11. The process according to claim 10, wherein said thermoplastic resin is a thermoplastic resin containing reinforcing fibers.

12. A process for producing the acoustic absorbing component as set forth in claim 1, comprising:

a step of setting a fiber-reinforced thermoplastic resin expanded body having a percentage of void not less than 50 vol % in a recessed portion formed in at least one of cavity faces of a pair of first and second molds kept in an open state;

a step of setting a thermoplastic resin sheet at least a surface of which is pre-heated at a temperature not less than a resin melting temperature, in a cavity formed between the cavity faces of said first and second molds kept in an open state; and a step of closing said first and second molds until a predetermined cavity clearance results between the molds, so as to shape said thermoplastic resin sheet, thereby obtaining a resin molded body, and fusing said fiber-reinforced thermoplastic resin expanded body to at least a part of a surface of the resin molded body under a pressure.

13. The process according to claim 12, wherein said thermoplastic resin sheet is a fiber-reinforced thermoplastic resin sheet having a percentage of void not more than 20 vol %.

14. The process according to claim 12, wherein said thermoplastic resin sheet is a fiber-reinforced thermoplastic resin sheet having a percentage of void not less than 50 vol %.

15. An acoustic absorbing component comprising a fiber-reinforced thermoplastic resin expanded body having a percentage of voids not less than 50 volume %, and a resin molded body, said fiber-reinforced thermoplastic resin expanded body being fused under pressure to at least a part of a surface of said resin molded body, a through hole being formed through the resin molded body and the fiber-reinforced thermoplastic resin expanded body, said fiber-reinforced thermoplastic resin expanded body projecting out of a part of the surface of said resin molded body, said expanded body having a height in longitudinal direction perpendicular to said surface of the resin molded body, which height is greater than a width of said expanded body in a direction perpendicular to said longitudinal direction.

16. An acoustic absorbing component comprising a fiber-reinforced thermoplastic resin expanded body having a percentage of voids not less than 50 volume %, a resin molded body, and a mixture layer being a mixture layer of said fiber-reinforced thermoplastic resin expanded body and said resin molded between the expanded body and the resin molded body and having a thickness between 0.1 and 1 mm said fiber-reinforced thermoplastic resin expanded body being fused under pressure to at least a part of a surface of said resin molded body to form said mixture layer said resin molded body and said resin expanded body being firmly joined with each other through said mixture layer.

17. The acoustic absorbing component according to claim 16, wherein said resin molded body is a thermoplastic resin molded body and said fiber-reinforced thermoplastic resin expanded body is an expanded body formed by expansion-molding of a fiber-reinforced thermoplastic resin sheet obtained by a sheet-making process.

18. The acoustic absorbing component according to claim 16, wherein said resin molded body is a fiber-reinforced resin molded body.

19. The acoustic absorbing component according to claim 16, wherein said fiber-reinforced thermoplastic resin expanded body is a first fiber-reinforced thermoplastic resin expanded body and said resin molded body is a second fiber-reinforced thermoplastic resin expanded body having a percentage of voids lower than the percentage of voids of said first fiber-reinforced thermoplastic resin expanded body.

20. The acoustic absorbing component according to claim 16, wherein said fiber-reinforced thermoplastic resin expanded body projects out of a part of the surface of said resin molded body.

21. The acoustic absorbing component according to claim 16, wherein a through hole is formed through the resin molded body and the fiber-reinforced thermoplastic resin expanded body.

* * * * *